July 1, 1958  S. GUSTAVSSON ET AL  2,841,360
VALVE FOR FUME CHANNELS
Filed June 7, 1956
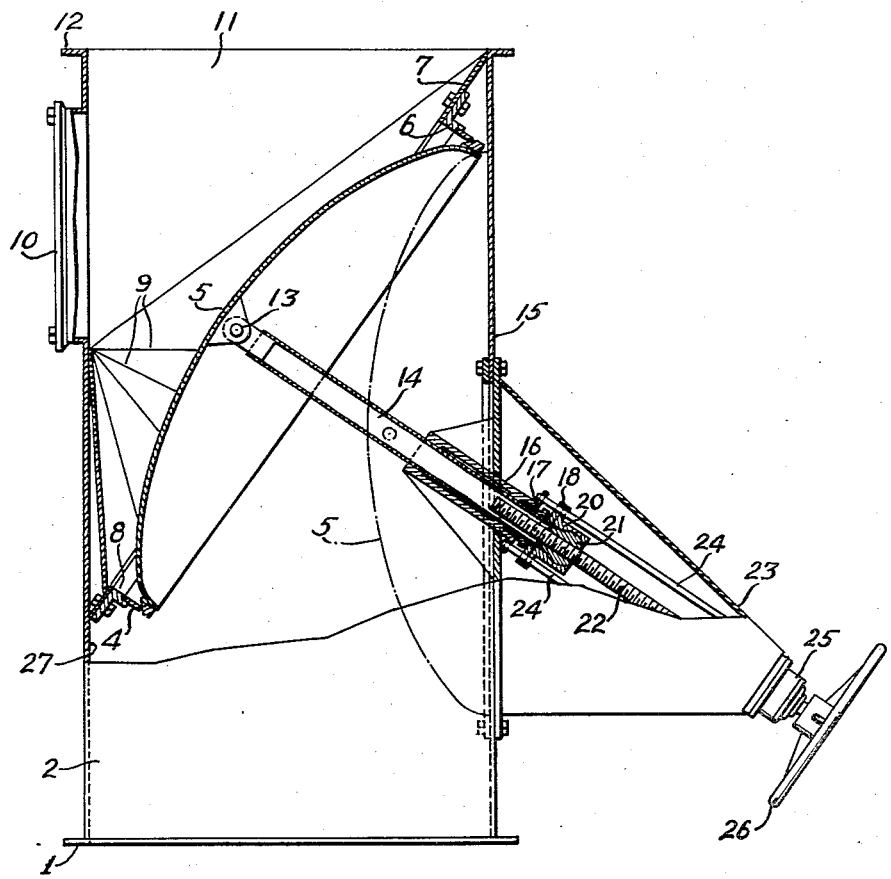
Inventors:
Stig Gustavsson
Max Ydring
Lars Rune Nylander
by Howson & Howson
Attys.

United States Patent Office 2,841,360
Patented July 1, 1958

1

2,841,360

VALVE FOR FUME CHANNELS

Stig Gustavsson, Jonkoping, Max Ydring, Stockholm, and Lars Rune Nylander, Enskede, Sweden, assignors to Aktiebolaget Svenska Flaktfabriken, Stockholm, Sweden Application June 7, 1955, Serial No. 513,864

2 Claims. (Cl. 251—87)

The present invention relates to a valve in a channel for fumes and similar dust-contaminated gaseous media, which valve consists of a valve housing with flanges for connection to the channel, a valve element in said housing and a spindle for the adjustment of the valve element. It is prior known to use closing devices in form of throttles or sliding dampers in channels for fumes or similar dust-contaminated gaseous media. It has however proved difficult to obtain proper sealing especially when using throttles. Sliding dampers have, on the other hand, the disadvantage of dust accumulation between the damper blade and the guiding means which results in difficulties in maneuvering the sliding dampers. It is an object of the invention to eliminate these drawbacks and to obtain a simple and robust valve for use under heavy conditions.

The valve according to the invention is mainly characterized by a circular flow passage in a partition diagonally arranged in the housing said opening provided with an L-iron and L-iron flange as a seat for the valve element and suitably equipped with a resilient sealing collar, and a dome-shaped valve element equipped with an outside tapered sealing flange around its periphery. The valve element is pivotally connected in such a manner to an adjusting spindle of conventional design—movable from the outside and arranged perpendicular to said partition— that the valve element when being moved from the closing position will swing angularly towards the said wall of the housing supporting the bearing for said spindle and that the valve element when situated in fully open position will be in alignment with said wall thus forming an entirely open flow passage of the device.

A suitable performance of this device for vertical channels is characterized by inclined plates arranged above the partition between the side walls of the housing and said partition and slanting towards the periphery of said circular flow passage opening, said plates preventing dust accumulation around said opening.

The invention will now be more fully described with reference to the accompanying drawing illustrating an embodiment of a valve made according to the invention.

In the drawing 2 designates a valve housing equipped with flanges 1 and 12 for the mounting of the device in a channel. The valve housing is by means of a diagonally arranged partition 7 divided in two halves. Said partition is provided with a circular flow passage 8. 6 designates a flange of L-iron extending around said flow-passage. The L-iron can be equipped with a resilient sealing flange 4. A dome-shaped valve element is designated 5. This is equipped with an outside tapered sealing flange around its periphery and said valve element is at the point 13 pivotally connected to an adjusting spindle 14. Said adjusting spindle passes a side wall 15 of the valve housing. 16 designates a guiding bushing for the spindle equipped with a packing box 17. The spindle 14 is by means of flanges 18 connected to the bearing 20, which is arranged to support a nut 21 ball-shaped on its outside. Said nut 21 is rotatably movable along a threaded rod 22. 24 designates guiding means for the bearing 20. Said guiding means 24 prevents the bearing 20 from rotating because of the turning of the rod by means of the wheel 26. The rod 22 is supported in the bearing 25, which in its turn is supported by the console 23 arranged on the wall 15. 10 designates an inspection door through which the space 11 at one side of the valve element is accessible. 27 designates in the corresponding manner a space at the other side of the valve element 5. 9 designates a number of sector-shaped plates, which plates when using the closing device in a vertical channel form inclined surfaces slanting towards the periphery of the opening 8. Said surfaces are arranged to prevent dust accumulation around said opening.

What we claim is:

1. A valve structure for fume channels and similar ducts for dust-contaminated gaseous media, comprising a valve casing adapted to form a portion of the channel, a cross-wall diagonally arranged in the casing, means defining an annular valve seat in said cross-wall, a valve element, and a screw-threaded valve stem movable relative to said seat and guided in a sleeve projecting outwardly through the wall of said valve casing to support said valve element in registry with said valve seat, characterized in that said valve element comprises an outwardly convex hollow dome-shaped rigid body, and a tapered sealing flange mounted on the outer peripheral surface of said dome-shaped body and engageable with the inner surface of said valve seat, said body of the valve element being pivotally connected on its rear concave side to said valve stem and devoid of other connections, whereby the valve element body upon displacement from the seat is free for pivotal displacement on said valve stem, upon re-engaging said seat to be self-centering and self-cleaning and in the fully open position thereof to seat against the wall of the casing, thus enclosing in said sleeve and providing a smooth unrestricted passage for the flow of dust-contaminated gaseous media.

2. A valve structure according to claim 1 wherein said fume channel is vertical and said valve-supporting sleeve is mounted below said cross-wall, and including inclined plates disposed above said cross-wall and extending from the side walls of the valve casing to the periphery of said valve seat to thereby constitute slide surfaces preventing dust accumulation in said channel above said cross-wall.

References Cited in the file of this patent

UNITED STATES PATENTS

| 106,867 | Pennock | Aug. 30, 1870 |
| 934,188 | Kirby | Sept. 14, 1909 |
| 956,357 | Irving | Apr. 26, 1910 |
| 1,588,752 | Lang | June 15, 1926 |
| 1,710,585 | Matthiessen | Apr. 23, 1929 |
| 2,151,296 | Knoerzer | Mar. 21, 1939 |
| 2,577,210 | Viola | June 19, 1951 |

FOREIGN PATENTS

| 1,063,200 | France | Dec. 16, 1953 |